(12) United States Patent
Mansour et al.

(10) Patent No.: US 8,019,385 B1
(45) Date of Patent: Sep. 13, 2011

(54) LOAD SIMULATION FOR TESTING UPLINK OF WIRELESS NETWORKS

(75) Inventors: Nagi A. Mansour, Arlington, VA (US); Rajesh M. Gangadhar, Ashburn, VA (US); Udit Thakore, Fairfax, VA (US)

(73) Assignee: Clear Wireless LLC, Kirkland, WA (US)

( * ) Notice: Subject to any disclaimer, the term of this patent is extended or adjusted under 35 U.S.C. 154(b) by 918 days.

(21) Appl. No.: 11/971,554

(22) Filed: Jan. 9, 2008

(51) Int. Cl. *H04B 1/38* (2006.01)
(52) U.S. Cl. .................. 455/561; 455/67.11; 455/452.2
(58) Field of Classification Search ............... 455/67.11, 455/561, 115.1, 115.2, 423, 450, 451, 452.1, 455/453, 455, 456.2, 464, 509, 67.14
See application file for complete search history.

(56) References Cited

U.S. PATENT DOCUMENTS

| | | | |
|---|---|---|---|
| 6,154,638 A | 11/2000 | Cheng et al. | |
| 7,573,851 B2 * | 8/2009 | Xing et al. | 370/334 |
| 2002/0004407 A1 * | 1/2002 | Simonsson | 455/522 |
| 2003/0153273 A1 * | 8/2003 | Ebert et al. | 455/67.4 |
| 2004/0203418 A1 | 10/2004 | Ang et al. | |
| 2006/0094365 A1 * | 5/2006 | Inogai et al. | 455/67.11 |
| 2006/0148429 A1 * | 7/2006 | Inogai et al. | 455/115.1 |
| 2006/0211427 A1 | 9/2006 | Azman et al. | |

* cited by examiner

*Primary Examiner* — Lana Le
*Assistant Examiner* — Ping Hsieh
(74) *Attorney, Agent, or Firm* — Crowell & Moring LLP

(57) ABSTRACT

Systems and methods of testing a base station are provided. A base station can generate simulated user data and combine this data with data received from mobile stations over an air interface. The combined data can then be evaluated to determine the effect of the simulated user data to the data received from mobile stations over the air interface.

14 Claims, 5 Drawing Sheets

LOAD SIMULATION FOR TESTING UPLINK OF WIRELESS NETWORKS

CROSS-REFERENCE TO RELATED APPLICATIONS

The present application is related to U.S. patent application Ser. No. 11/939,136, filed Nov. 13, 2007, the entire disclosure of which is herein expressly incorporated by reference.

BACKGROUND OF THE INVENTION

Wireless communication networks are very complicated, and expensive to deploy. Prior to deploying a wireless communication network, extensive computer simulations are performed in order to optimize the parameters and placement of networks elements. Computer simulations cannot, however, account for the real-world conditions in which the network is deployed. Accordingly, once a wireless communication network is installed, additional testing is performed in order to account for real-world conditions. Furthermore, as wireless communication networks are expanded with additional base stations to provide additional capacity, the network must again be tested to optimize the base stations.

SUMMARY OF THE INVENTION

An exemplary method for a base station in a wireless network involves generating simulated user data and processing the simulated user data using a fast Fourier transform. The processed simulated user data is upconverted to radio frequencies at a predetermined power level. Radio frequency signals, including data received from at least one mobile station, are received. The upconverted simulated user data is combined with the radio frequency signals including data received from the at least one mobile station to form a combined signal. The combined signal is processed in order to determine an effect of the upconverted simulated user data to the radio frequency signals including the data received from the at least one mobile station.

An exemplary base station includes a simulated user data generator that generates simulated user data, and power level determination logic that determines a predetermined power level for the simulated user data. The base station also includes a radio frequency signal generator, coupled to the simulated user data generator and power level determination logic, which upconverts the simulated user data to radio frequencies at the predetermined power level. A summer is coupled to the radio frequency signal generator. The summer combines the upconverted simulated user data and radio frequency signals including data received from the at least one mobile station to form a combined signal. A signal evaluator processes the combined signal in order to determine an effect of the upconverted simulated user data to the radio frequency signals including the data received from the at least one mobile station.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
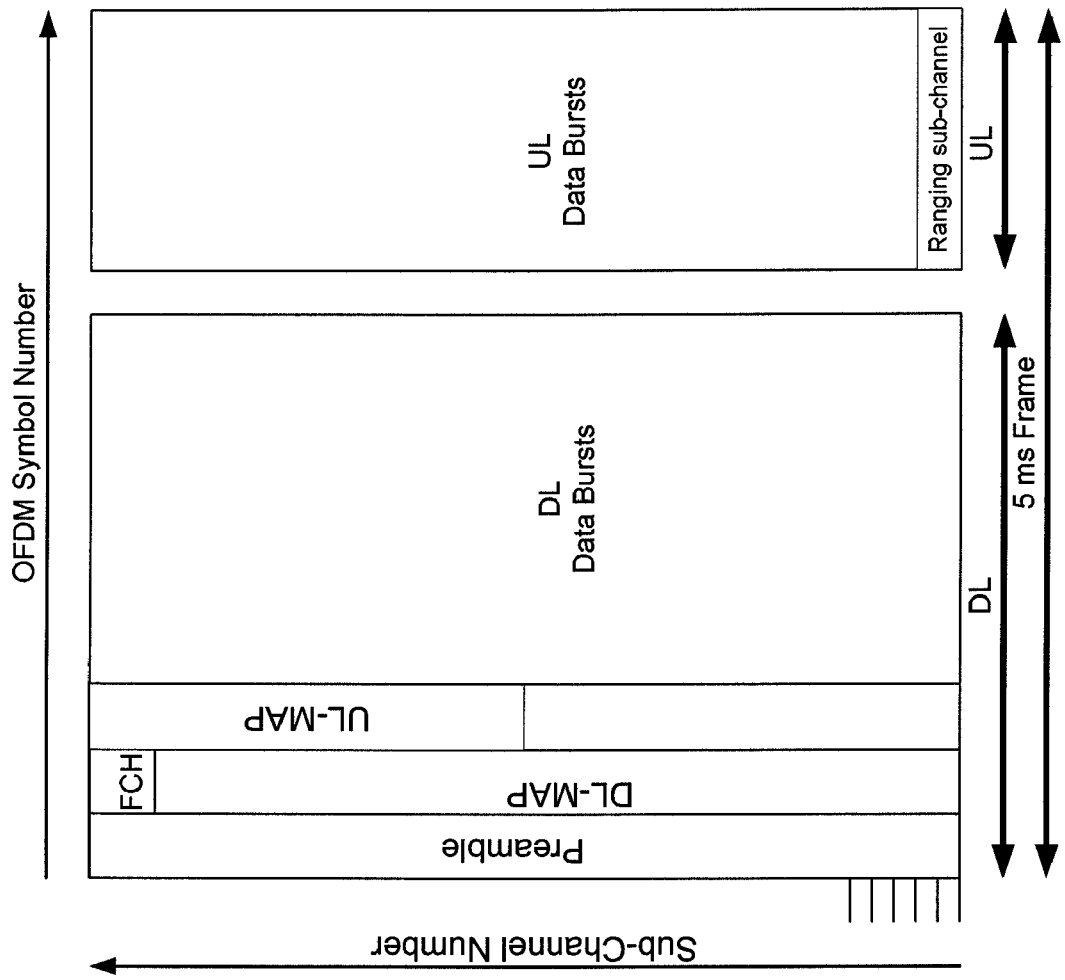
FIG. 1 is a block diagram of an exemplary WiMAX time division duplex (TDD) frame

Exemplary embodiments of the present invention involve testing wireless networks that employ orthogonal frequency division multiplexing (OFDM), such as a WiMAX network. FIG. 1 is a block diagram of an exemplary WiMAX time division duplex (TDD) frame. The frame structure begins with a preamble that is used for physical layer procedures, such as time and frequency synchronization and initial channel estimation. The downlink (DL) preamble is followed by a frame control header (FCH) that provides frame configuration information, such as MAP message length and the usable sub-carriers. Multiple users are allocated data regions within the frame, and these allocations are specified in the uplink and downlink messages (DL-MAP and UL-MAP). In the TDD operation using a 10 MHz channel, the frame has an allocation in time of 48 symbols and an allocation in frequency using 1024 sub-carriers. For the downlink/uplink ratio of 3:2 there will be 22:15 data symbols with the rest of the frame used for preamble and control channels. Symbols and sub-carriers are resources that can be assigned to users.

For example, in a WiMAX system that use a 10 MHz channel 840 sub-carriers are used to carry user data and pilots in the uplink. The 840 sub-carriers constitute 35 sub-channels, and each sub-channel has 16 user data sub-carriers and 8 pilot sub-carriers.

Figure 2A:
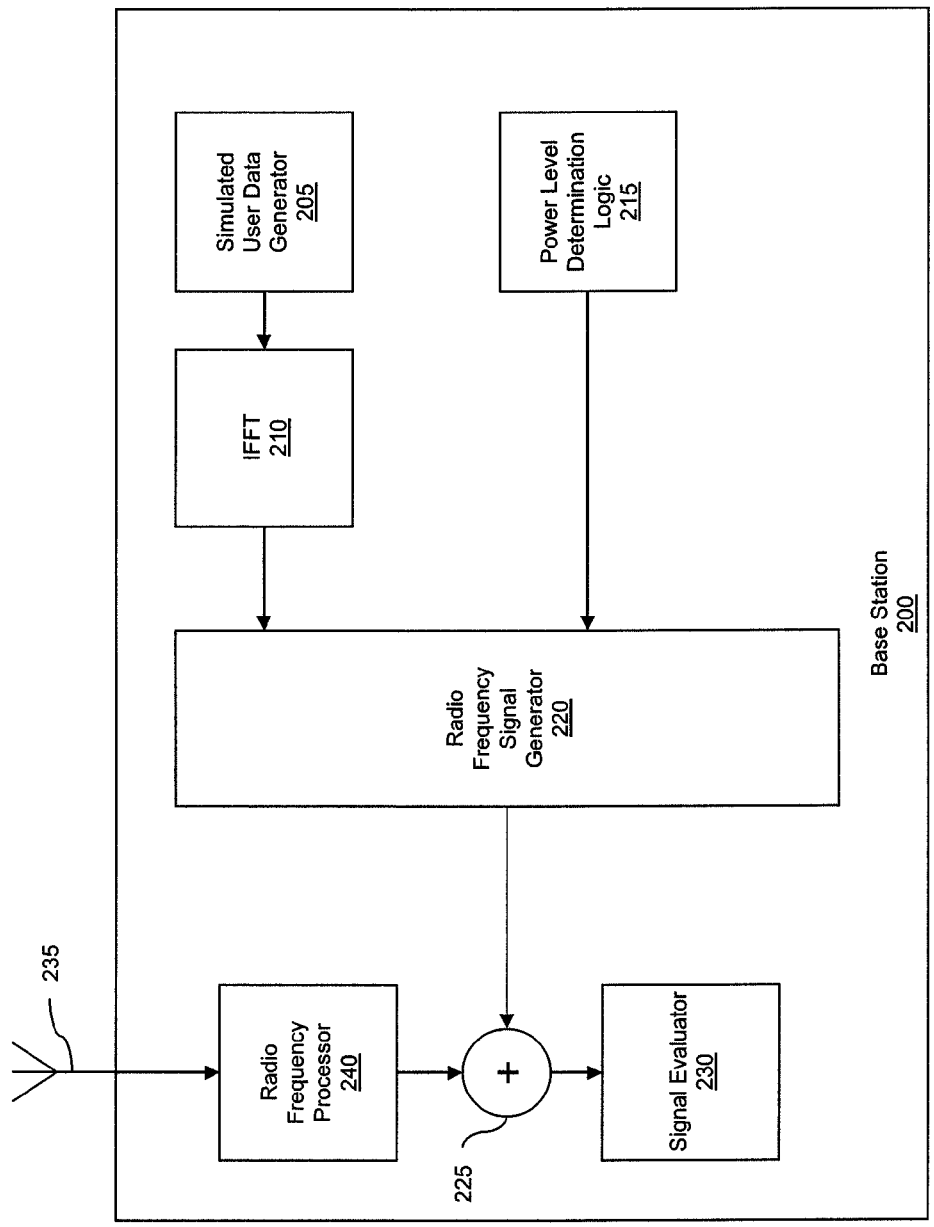
FIG. 2A is a block diagram illustrating an exemplary base station in accordance with the present invention.

FIG. 2A is a block diagram illustrating an exemplary base station in accordance with the present invention. Base station 200 includes antenna 235 for exchanging communication signals with mobile stations. Signals received by antenna 235 are provided to radio frequency processor 240, which demodulates the received signals and provides the demodulated signals to summer 225. Summer 225 receives simulated user data from radio frequency signal generator 220, and provides the combined signals to signal evaluator 230. Signal evaluator 230 evaluates the affect of the simulated user data to the communication signals received from mobile stations.

The simulated user data is generated by element 205 and provided to inverse fast Fourier transform (IFFT) 210, which spreads the simulated user data across all uplink sub-channels of the frequency band used by mobile stations to communicate with base station 200 and provides the resultant signal to radio frequency signal generator 220. Power level determination logic 215 determines a power level for the simulated user data and provides the determined power level to radio frequency signal generator 220, which then upconverts the simulated user data to radio frequencies at the determined power level.

Figure 2B:
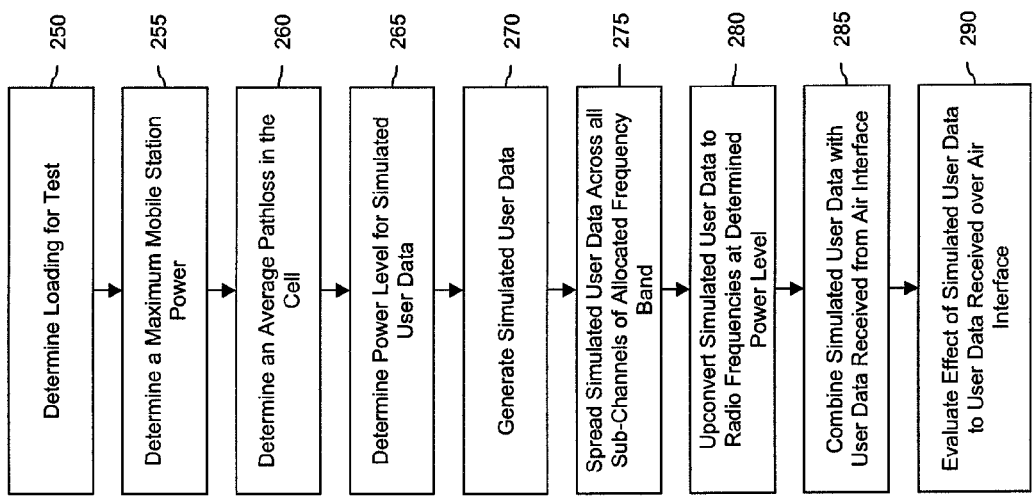
FIG. 2B is a flow diagram of an exemplary method in accordance with the present invention.

FIG. 2B is a flow diagram of an exemplary method in accordance with the present invention. Initially, logic 215 determines a loading level for the test, a maximum mobile station power level and an average pathloss for the cell in which the base station is located (steps 250-260). Logic 215 then determines the power level for the simulated user data by subtracting the average pathloss, pilot powers and the fraction of power allocated to the control channels (ranging channels, ACKCH, and CQICH) from the maximum mobile station power level (step 265). If less than 100% loading was determined in step 250, logic 215 adjusts the user data power level based on the determined loading. For example, if a determined loading is 50%, then the determined user data power level is reduced by 3 dB.

Element 205 generates the simulated user data (step 270), which is provided to radio frequency signal generator 220 via IFFT 210. IFFT 210 spreads the simulated user data across all sub-channels of the frequency band assigned for communications by the base station (step 275). Element 220 upconverts the simulated user data to radio frequencies at the power level provided by logic 215, and provides the radio frequency signals to summer 225 (step 280). Summer 225 combines the radio frequency signals with the simulated user data and radio frequency signals from mobile stations that are received from processor 240 by way of antenna 235 (step 285). The combined signals are provided to evaluator 230, which evaluates the effect of the simulated user data to user data received from the mobile stations (step 290).

Figure 3A:
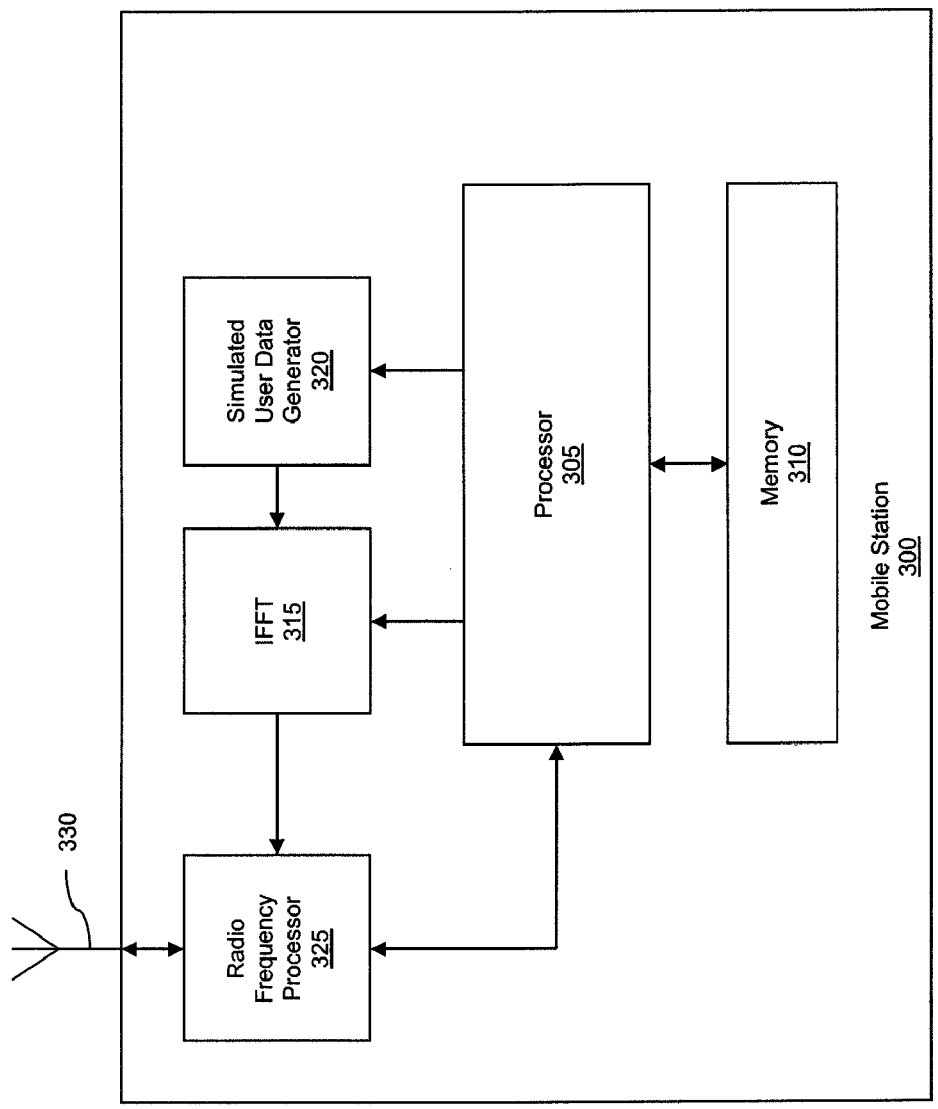
FIG. 3A is a block diagram of an exemplary mobile station in accordance with the present invention.

FIG. 3A is a block diagram of an exemplary mobile station in accordance with the present invention. Mobile station 300 includes processor 305, which is coupled to memory 310, simulated user data generator 320, IFFT 315 and radio frequency processor 325. This mobile station can be used as an alternative to, or in addition to, the base station of FIG. 2A. Specifically, the simulated user data is generated by one or more mobile stations 300 and then transmitted to the base station. Each mobile station travels a predefined route within a particular cell and transmits the simulated user data at full power.

Figure 3B:
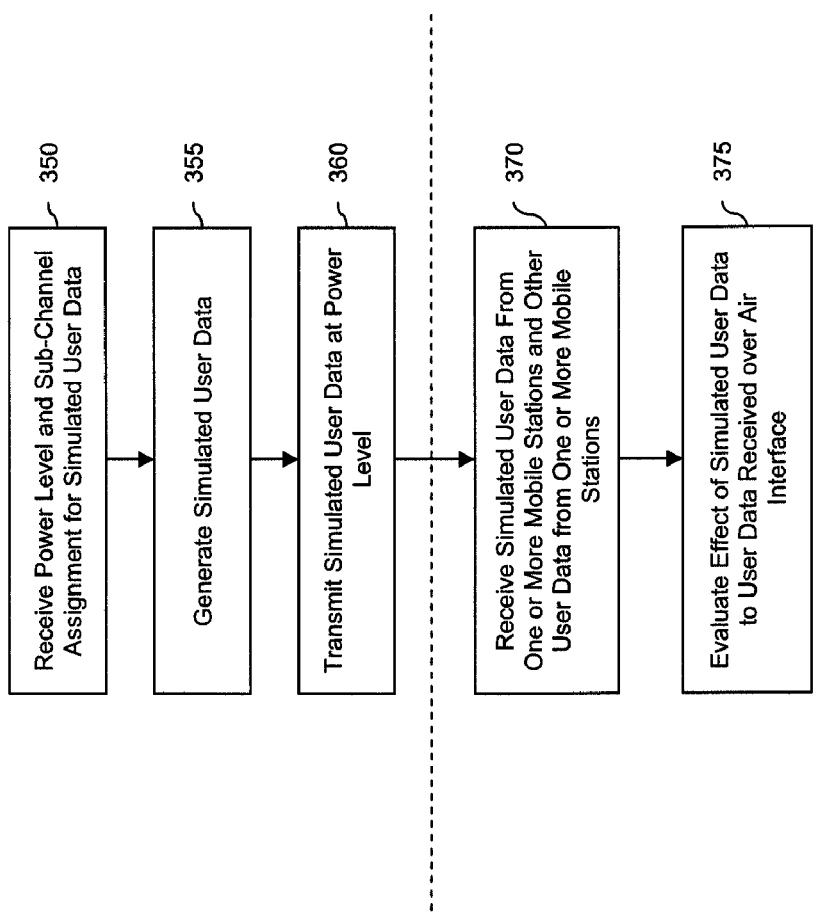
FIG. 3B is a flow diagram of an exemplary method in accordance with the present invention.

FIG. 3B is a flow diagram of an exemplary method in accordance with the present invention. The method involves one or more mobile stations that transmit simulated user data, in addition to other mobile stations that are transmitting regular user data. For example, four to eight mobile stations can each be assigned two or three sub-channels and each mobile station will transmit simulated user data at the full power allowed for mobile stations.

Initially, mobile station 300 receives a power level and sub-channel assignment for transmission of simulated user data (step 350). Processor 305 processes this information and instructs element 320 to generate simulated user data (step 355), and element 315 to spread the simulated user data across the assigned sub-channels. Processor 305 then instructs radio frequency processor 325 to upconvert the simulated user data and transmit it at the assigned power level (step 360). A base station receives simulated user data from one or more mobile stations and other user data received from the air interface (step 370) and evaluates the effect of the simulated user data to the user data received over the air interface (step 375).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for a base station in a wireless network, the method comprising the act of:
   generating simulated user data;
   processing the simulated user data using a fast Fourier transform;
   upconverting the processed simulated user data to radio frequencies at a predetermined power level;
   receiving, via the base station's antenna, radio frequency signals including data received from at least one mobile station;
   combining the upconverted simulated user data with the radio frequency signals including data received from the at least one mobile station to form a combined signal;
   processing the combined signal in order to determine an effect of the upconverted simulated user data to the radio frequency signals including the data received from the at least one mobile station.

2. The method of claim 1, wherein the predetermined power level is a maximum mobile station power level minus an average pathloss of a cell in which the base station is located, pilot powers and a fraction of power allocated to control channels.

3. The method of claim 2, wherein the act of processing the simulated user data using a fast Fourier transform involves spreading the simulated user data over all sub-channels of a predetermined frequency band.

4. The method of claim 3, wherein the radio frequency signals received from the at least one mobile station are received within sub-channels of the predetermined frequency band.

5. The method of claim 2, wherein the predetermined power level is selected corresponding to a desired load for testing the base station.

6. The method of claim 2, wherein the radio frequency signals are formatted in accordance with orthogonal frequency division multiplexing.

7. The method of claim 2, wherein at least some of the data received from the at least one mobile station includes simulated user data.

8. A base station, comprising:
   a simulated user data generator that generates simulated user data;
   power level determination logic that determines a predetermined power level for the simulated user data;
   a radio frequency signal generator, coupled to the simulated user data generator and power level determination logic, which upconverts the simulated user data to radio frequencies at the predetermined power level;
   a summer coupled to the radio frequency signal generator, which combines the upconverted simulated user data and radio frequency signals including data received, via the base station's antenna, from at least one mobile station to form a combined signal;
   a signal evaluator which processes the combined signal in order to determine an effect of the upconverted simulated user data to the radio frequency signals including the data received from the at least one mobile station.

9. The base station of claim 8, wherein the predetermined power level is a maximum mobile station power level minus an average pathloss of a cell in which the base station is located, pilot powers and a fraction of power allocated to control channels.

10. The base station of claim 9, further comprising:
    a fast Fourier transform processor, coupled between the simulated user data generator and radio frequency signal generator, which spreads the simulated user data over all sub-channels of a predetermined frequency band.

11. The base station of claim 10, wherein the radio frequency signals received from the at least one mobile station are received within sub-channels of the predetermined frequency band.

12. The base station of claim 9, wherein the predetermined power level is selected corresponding to a desired load for testing the base station.

13. The base station of claim 9, wherein the radio frequency signals are formatted in accordance with orthogonal frequency division multiplexing.

14. The base station of claim 9, wherein at least some of the data received from the at least one mobile station includes simulated user data.

* * * * *